US012392002B2

United States Patent
Xu et al.

(10) Patent No.: US 12,392,002 B2
(45) Date of Patent: Aug. 19, 2025

(54) CONTINUOUS STIRRING TRANSMISSION MECHANISM FOR TEMPERING FURNACE WORKPIECE TRANSMISSION AND TRANSMISSION METHOD

(71) Applicants: SHANDONG JIANZHU UNIVERSITY, Shandong (CN); SHANDONG LIANMEI SPRING CO., LTD, Shandong (CN)

(72) Inventors: Rongfu Xu, Shandong (CN); Simon Yisheng Feng, Shandong (CN); Yunshan Zhang, Shandong (CN); Peng Qi, Shandong (CN); Zhenmei Chu, Shandong (CN); Yihao Ma, Shandong (CN); Lei Yin, Shandong (CN)

(73) Assignees: Shandong Jianzhu University, Jinan (CN); Shandong Lianmei Spring CO., LTD, Zibo (CN)

( * ) Notice: Subject to any disclaimer, the term of this patent is extended or adjusted under 35 U.S.C. 154(b) by 0 days.

(21) Appl. No.: 18/916,708

(22) Filed: Oct. 16, 2024

(65) Prior Publication Data
US 2025/0163528 A1 May 22, 2025

(30) Foreign Application Priority Data
Nov. 18, 2023 (CN) .......................... 202311544264.9

(51) Int. Cl.
*C21D 9/00* (2006.01)
*F27D 3/00* (2006.01)
(52) U.S. Cl.
CPC ......... *C21D 9/0056* (2013.01); *F27D 3/0024* (2013.01); *F27D 2003/0042* (2013.01)
(58) Field of Classification Search
CPC ................. C21D 9/0056; F27D 3/0024; F27D 2003/0042
(Continued)

(56) References Cited

U.S. PATENT DOCUMENTS 2,898,101 A * 8/1959 Hannum ................ F27B 9/243
432/87
3,219,330 A * 11/1965 Acker ..................... C21D 1/74
266/132
(Continued)

FOREIGN PATENT DOCUMENTS

CN 201660688 U 12/2010
CN 103498037 A 1/2014
(Continued)

OTHER PUBLICATIONS

CN205528893, Du, A Metal Heat-treating Furnace, (Year: 2016).*
(Continued)

*Primary Examiner* — Jessee R Roe
*Assistant Examiner* — Michael Aboagye

(57) ABSTRACT

The present disclosure discloses a continuous stirring transmission mechanism for tempering furnace workpiece transmission, including a heat treatment furnace body and a furnace body support, the heat treatment furnace body is fixed to the furnace body support, the heat treatment furnace body includes a furnace body shell, a heat preservation and insulation system and a heating system, the heating system supplies heat to the heat treatment furnace body; the mechanism further includes a driving mechanism and continuous stirring rotating rod assemblies. The continuous stirring transmission mechanism is provide for tempering furnace workpiece transmission; the problems of non-uniform heating of metal workpieces in the tempering process can be solved, and a heat utilization rate is improved. The transmission method and continuous stirring transmission mechanism has no special requirements for sites, eliminating the need to dig a pit, and solving the problems such as difficult carrying during workshop process adjustment.

7 Claims, 3 Drawing Sheets

(58) Field of Classification Search
USPC .................................................. 266/249, 252
See application file for complete search history.

(56) References Cited

U.S. PATENT DOCUMENTS 5,261,656 A * 11/1993 Gutov .................. B65H 29/003
271/204
7,413,436 B2 * 8/2008 Wuenning ................ F27D 9/00
492/46

FOREIGN PATENT DOCUMENTS

| CN | 107773938 | * | 5/2014 | ............. F27D 3/026 |
| CN | 204872505 | * | 12/2015 | ............. F27D 3/026 |
| CN | 205528893 | * | 8/2016 | ............. F27D 3/026 |
| CN | 205528893 U | | 8/2016 | |
| CN | 211947160 U | | 11/2020 | |
| CN | 114395693 B | | 8/2022 | |
| CN | 114990313 A | | 9/2022 | |
| CN | 115597381 A | | 1/2023 | |
| JP | 2000053232 A | | 2/2000 | |

OTHER PUBLICATIONS

CN204872505, Xu et al., The steel Ball Conveying Mechanism (Year: 2015).*
CN107773938, Fan et al. , Temperature Control Energy-Saving Type Continuous Heating Furnace (Year: 2014).*

* cited by examiner

CONTINUOUS STIRRING TRANSMISSION MECHANISM FOR TEMPERING FURNACE WORKPIECE TRANSMISSION AND TRANSMISSION METHOD

TECHNICAL FIELD

The present disclosure relates to the field of heat treatment transmission technologies and heat treatment devices, in particular to a continuous stirring transmission mechanism for tempering furnace workpiece transmission and a transmission method.

BACKGROUND ART

Heat treatment, as an important hot working process, is widely used in the mechanical manufacturing industry. Heat treatment, as a critical process for enhancing the performance and extending the service life of mechanical parts, fully maximizes the potential of metal materials. It is also an effective method for conserving materials, saving energy, and reducing consumption. Controlling temperature parameters is essential in any heat treatment process, and achieving precise temperature control requires the use of appropriate heat treatment furnace. A heat treatment furnace is the primary device used to carry out the heat treatment process for metals. An advanced heat treatment process cannot be achieved without an advanced furnace. The technological level and design quality of the furnace are crucial factors in determining the success of the heat treatment process.

Tempering is a critical heat treatment procedure for improving performance of metal workpieces. It involves heating quenched metal workpieces to an appropriate temperature (lower than 727° C.) below Ac1, holding them at that temperature for a specified duration, and then cooling the workpieces in accordance with process requirements. The main purpose of tempering is to eliminate residual stress generated during the quenching of metal workpieces, preventing deformation and cracking. It also serves to adjust the hardness, strength, plasticity, and toughness of the metal, stabilize structures and dimensions, and ensure precision. Tempering furnaces are usually classified into a continuous tempering furnace, a vacuum tempering furnace, an all-fiber trolley type tempering furnace, an all fiber well type tempering furnace and the like. The continuous tempering furnace is commonly used for the tempering of large batches of metal workpieces. This type of furnace has several key advantages: it features an intelligent temperature controller and an automatic control system, with temperature precision controllable within ±3° C. at a furnace temperature of 500° C. Additionally, the furnace is equipped with a hot air stirring apparatus, ensuring precise temperature balance, which results in tempered metal workpieces of stable and reliable quality The continuous tempering furnace used in current production has several drawbacks, including a large occupied area of the device, high one-off investment and difficult in process adjustment. In particular, due to the structural design of the furnace body, a pit must be dug in the workshop to install the heating furnace and accommodate the external chain circulation system. Additionally, process adjustments and transportation of this type of tempering furnace become challenging when process improvements or adjustments are required in the production line for workpieces. Many manufacturers still use the outdated tempering furnaces in actual production due to the consideration of production cost. Published patents CN202210292531.7, CN202210576064.0 and the like still have addressed the technical difficulties of continuous conveying of metal workpieces by the traditional continuous tempering furnace. However, the following three main problems remain unsolved: firstly, the metal workpieces are not uniformly heated. Due to the contact between the metal workpieces and angle steel, the heating speed of the workpieces that are close to the angle steel is low, whereas the heating speed of the workpieces that are not in contact with the angle steel is high. This discrepancy in heating rates results in local temperature inconsistencies across the metal workpieces, which in turn leads to non-uniform properties of the metal workpieces, and ultimately affects the quality of the metal workpieces. Secondly, the furnace occupies a large area, and process adjustments are difficult. A pit must be dug for the existing continuous tempering furnace to accommodate the chain's circulation during continuous operation. Additionally, the furnace is difficult to move when process improvements or workshop rearrangements are required. Thirdly, there is an issue with energy efficiency. In current continuous tempering furnaces, the transmission mechanisms are enclosed within the furnace body. Components such as chains, chain plates, and V-shaped angle steel on the chain plates, along with the workpieces being conveyed, remain relatively static. These components continuously move with the workpieces through the furnace hearth, absorbing a significant amount of heat during the process. As the chains and chain plates exit the furnace along with the workpieces, they lose a considerable amount of heat, leading to energy inefficiency. In a reciprocating cycle, the chains and chain plates have been cooled re-enter the hearth to absorb heat. This process results in a significant amount of heat being absorbed by these components, such as the V-shaped angle steel, while only a small fraction of the heat is effectively utilized by the workpieces. Consequently, this method leads to substantial resource wastage. In order to solve and overcome the problems and defects in the above-mentioned continuous tempering furnace, the present disclosure provides a continuous stirring transmission mechanism for tempering furnace workpiece transmission and a working method.

SUMMARY

The technical problem to be solved by the present disclosure is to provide a continuous stirring transmission mechanism for tempering furnace workpiece transmission. The mechanism is characterized by three main features: firstly, it has a simple structure and is easy to operate; during operation, the workpieces move relative to the mechanism's rotating rod, while the rods remain fixed but rotate, the workpieces are conveyed in a wave-like rolling motion. This solves issues such as non-uniform heating and the difficulty of improving heat utilization during the tempering process, all while ensuring continuous transmission of the metal workpieces. thirdly, the disclosed transmission method and mechanism do not have special site requirements, eliminating the need for pit excavation and resolving challenges related to process adjustments in a workshop.

The aim of the present disclosure is achieved by the following technical solution:

A continuous stirring transmission mechanism for tempering furnace workpiece transmission, includes a heat treatment furnace body and a furnace body support. The furnace body is fixed by the furnace body support, and includes a furnace body shell, a heat preservation and insulation system, and a heating system, the heating system with the latter supplying heat to the furnace. The heating system is an electric heating system. The mechanism also includes a driving mechanism and continuous toggling rotating rod assemblies, both of which are supported by the furnace support.

The continuous stirring rotating rod assemblies are connected with the driving mechanism, each of the continuous stirring rotating rod assemblies includes a group of first rotating rods, a group of second rotating rods and fixing bearings, each of the first rotating rods and each of the second rotating rods are alternately arranged, the first rotating rods and the second rotating rods are arranged in parallel, two ends of each of the first rotating rods and two ends of each of the second rotating rods are connected with the fixing bearings through bearings respectively. Each of the fixing bearings is fixed to two sides of an upper portion of a support, and the continuous stirring rotating rod assemblies are mounted on the support through the fixing bearings;

each of the first rotating rods and each of the second rotating rods respectively include a rotating shaft and vane assemblies) uniformly arranged in a circumferential direction of the rotating shaft, the vane assemblies are fixedly connected with the rotating shaft, and spatial orientations of the mounted vane assemblies remain consistent with no misplacement allowed.

The rotating shaft includes an extension section, two journal sections, a working section and two tool withdrawal grooves. The extension section is arranged at one end of the rotating shaft and is connected with the driving mechanism. The journal sections are arranged on two sides of the rotating shaft and are connected with the fixing bearings. The working section is arranged in a middle of the rotating shaft and is used for mounting the vane assemblies.

A plurality of vane assemblies are provided, with each assembly consisting of two or more vanes arranged circumferentially around the rotating shaft. The angular spacing between the adjacent vane assemblies in the circumferential direction of the rotating shaft is 360°/n, wherein n represents the number of the vanes. The first set of rotating rods is connected to an odd number of the vane assemblies, while the second set of rotating rods is connected with an even number of the vane assemblies. The difference between the number of the vane assemblies connected to the first and second sets of rotating rods is 1.

As a further limitation of the technical solution, the driving apparatus includes gears, with one gear fixed to the extension section of each rotating shafts. The adjacent gears engage with each other through intermediate gears, whose center shafts of the intermediate gears are connected with gear supports through bearings. The support is fixed by the gear supports. All the gears are arranged in the same straight line, with one gear at one end of the straight line engaging with a driving gear. The output end of the driving motor is fixed to a center of the driving gear.

As a further limitation of the technical solution, the driving apparatus includes gears, with one gear fixed to the extension section of each rotating shafts. The adjacent gears engage with each other, all the gears are arranged on the same straight line, one gear at one end of the straight line engages with a driving gear. The output end of the driving motor is fixed to a center of the driving gear.

As a further limitation of the technical solution, the driving apparatus includes driven chain wheels and a driving chain wheel. A driven chain wheel is fixed to the extension section of each rotating shaft, while the driving chain wheel is fixedly connected to a power output of the driving apparatus. The driving chain wheel and all driven chain wheels are interconnected by a continuous chain, and both the driven chain wheels and the driving chain wheel are arranged in a straight line.

As a further limitation of the technical solution, the continuous stirring rotating rod assembly is provided with a plurality of first rotating rods and a plurality of second rotating rods, the continuous stirring rotating rod assembly is fixedly mounted on the support in a crossed arrangement manner of the first rotating rods, the second rotating rods, the first rotating rods, the second rotating rods, . . . , an axial distance between the first rotating rods and the second rotating rods during mounting is a length of the vanes on the vane assemblies+1 mm–50 mm, and a spacing distance between the vane assemblies on the first rotating rods or the second rotating rods is a width of the vanes+1 mm–50 mm.

Compared with the related art, the continuous stirring transmission mechanism for tempering furnace workpiece transmission provided by the present disclosure has the following beneficial effects:

(1) According to the continuous stirring transmission mechanism for tempering furnace workpiece transmission and the disclosed working method in the technical solution, heated metal workpieces are continuously overturned and move forward during transmission by this type of mechanism. As the workpieces are overturned and conveyed, their heated positions continuously change, resulting in uniform heating throughout the entire workpiece. This process solves the problem of uneven heating found in existing continuous tempering furnaces, thereby improving the mechanical performance of the metal workpieces.

(2) The driving mechanism of the continuous stirring propelling transmission mechanism in the technical solution is mounted on the support and mounted outside the furnace body of a tempering furnace, eliminating the need for pit excavation in a workshop. This design solves the problems such as large occupied area and the difficulty of process adjustment associated with the transmission systems of existing continuous tempering furnaces.

(3) The continuous stirring propelling transmission mechanism in the technical solution offers several advantages, including stable rolling conveyance of metal workpieces, a simple structure, ease of implementation, and low cost.

DETAILED DESCRIPTION OF THE EMBODIMENTS

The present disclosure will be further described with reference to accompanying drawings and implementations.

Embodiment 1

Figure 1:
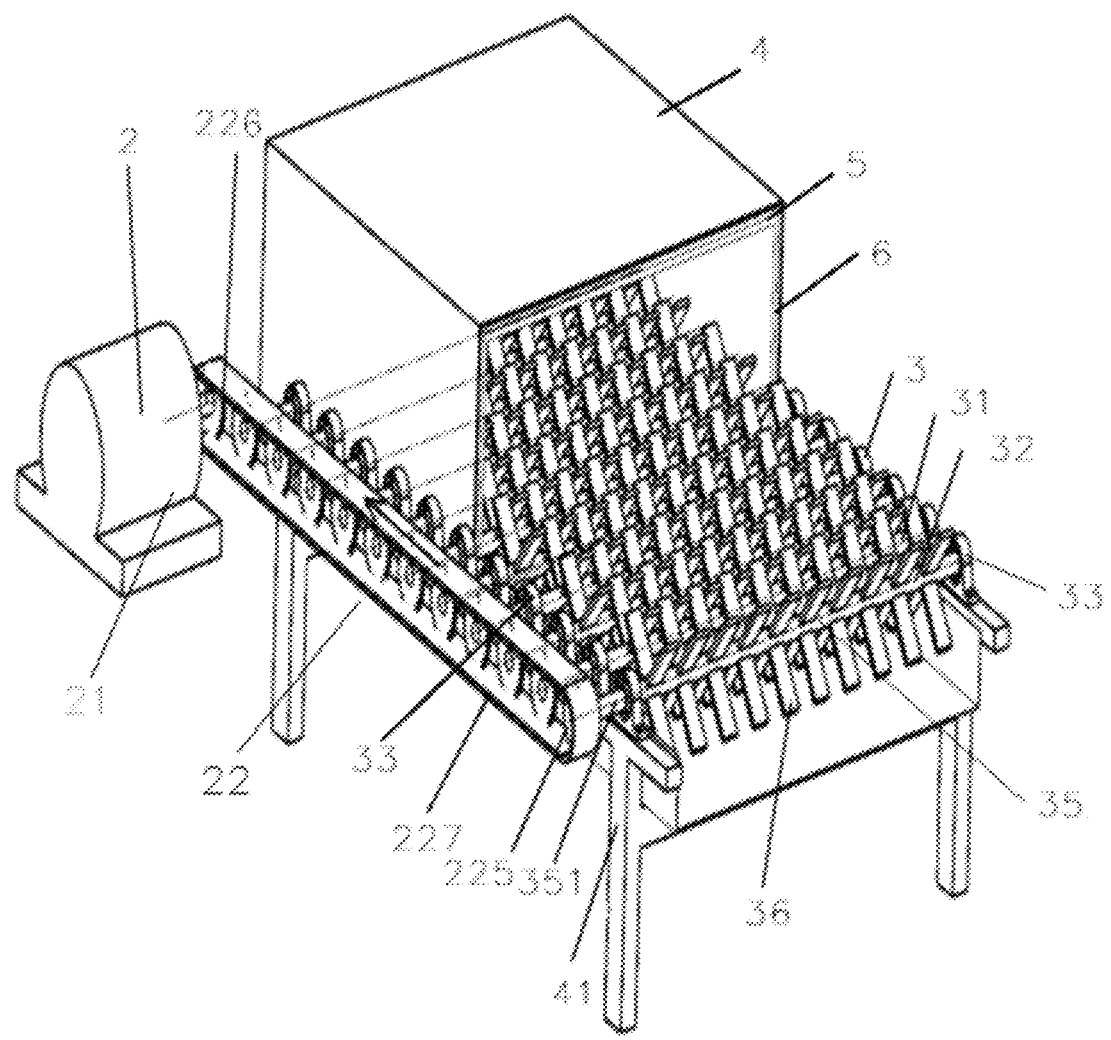
FIG. 1 is a schematic diagram of the 3-D structural drawing in Embodiment 2 of the present disclosure.
Figure 2:
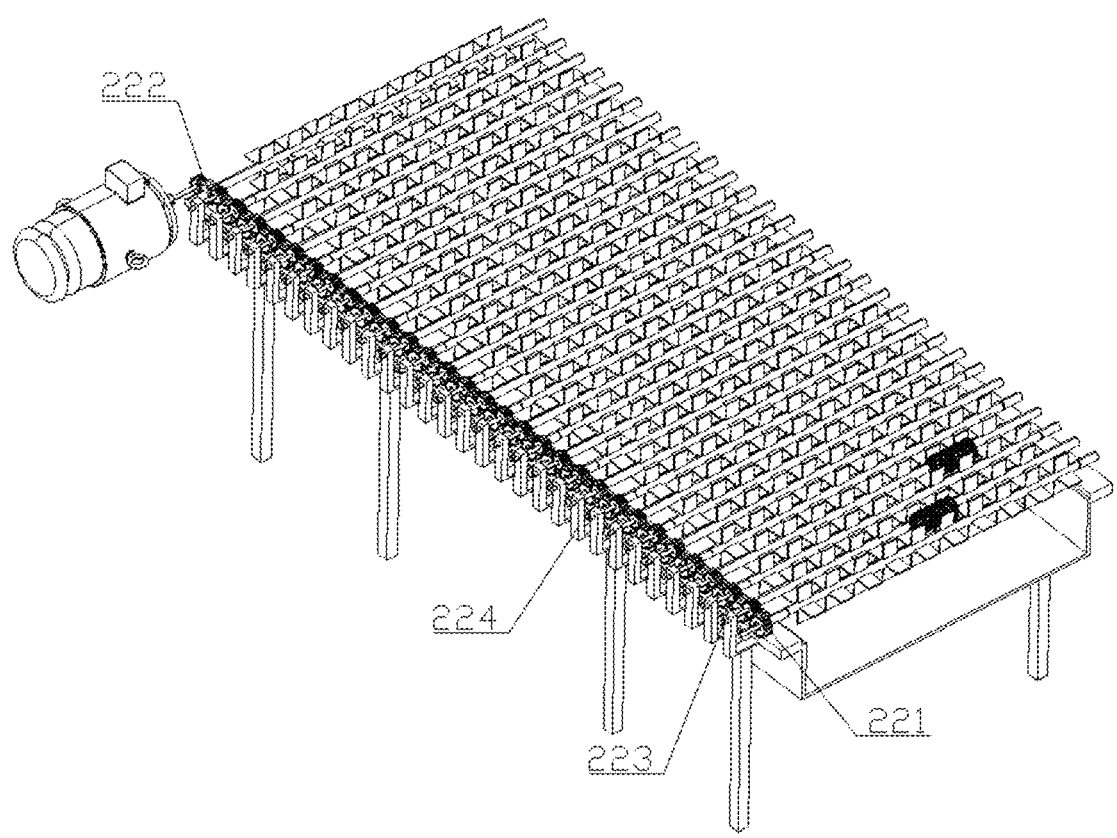
FIG. 2 is a schematic diagram of the partial 3-D structural drawing in Embodiment 1 of the present disclosure.
Figure 3:
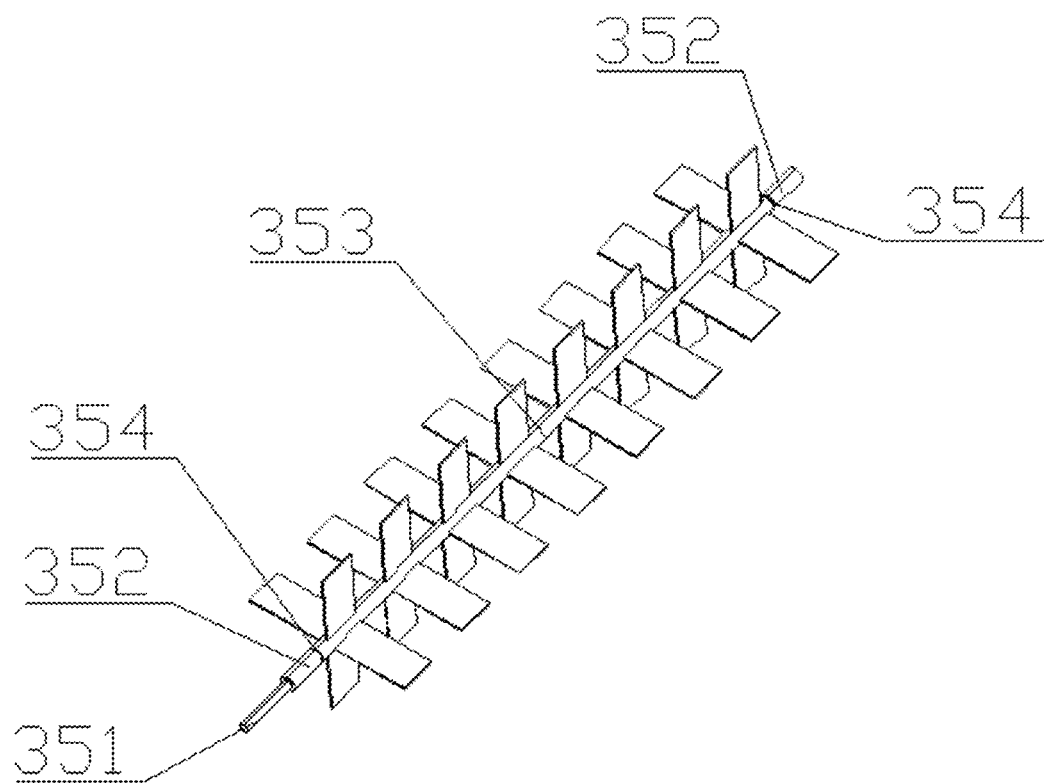
FIG. 3 is a schematic diagram of the partial 3-D structural drawing of the present disclosure.

With reference to FIG. 1 to FIG. 4, FIG. 1 is a schematic diagram of the 3-D structural drawing of a continuous stirring transmission mechanism for tempering furnace workpiece transmission in Embodiment 2 of the present disclosure, FIG. 2 is a schematic diagram of the partial 3-D structural drawing in Embodiment 1 of the present disclosure, and FIG. 3 is a schematic diagram of a 3-D structural drawing of a rotating shaft of the present disclosure.

A continuous stirring transmission mechanism for tempering furnace workpiece transmission, includes a heat treatment furnace body 4 and a furnace body support 41, the heat treatment furnace body 4 is fixed by the furnace body support 41, the heat treatment furnace body 4 includes a furnace body shell, a heat preservation and insulation system 5 and a heating system 6, the heating system 6 supplies heat to the heat treatment furnace body 4, and the heating system is an electric heating system; the mechanism further includes a driving mechanism 2 and continuous stirring rotating rod assemblies 3, and the furnace body support 41 further supports the driving mechanism 2 and the continuous stirring rotating rod assemblies 3.

The continuous stirring rotating rod assemblies 3 are connected with the driving mechanism 2, each of the continuous stirring rotating rod assemblies 3 includes a group of first rotating rods 31, a group of second rotating rods 32 and fixing bearings 33, each of the first rotating rods 31 and each of the second rotating rods 32 are alternately arranged, the first rotating rods 31 and the second rotating rods 32 are arranged in parallel, two ends of each of the first rotating rods 31 and two ends of each of the second rotating rods 32 are connected with the fixing bearings 33 respectively through bearings, each of the fixing bearings 33 is fixed to two sides of an upper portion of a support 1, and the continuous stirring rotating rod assemblies 3 are mounted on the support 1 through the fixing bearings 33.

Each of the first rotating rods 31 and each of the second rotating rods 32 respectively include a rotating shaft 35 and vane assemblies 36 uniformly arranged in a circumferential direction of the rotating shaft, the vane assemblies 36 are fixedly connected with the rotating shaft 35, and spatial orientations of the mounted vane assemblies 36 remain consistent with no misplacement allowed.

Referring to FIG. 3, the rotating shaft 35 includes an extension section 351, two journal sections 352, a working section 353 and two tool withdrawal grooves 354. The extension section 351 is arranged at one end of the rotating shaft 35 and is connected to the driving mechanism 2. The journal sections 352 are arranged on both sides of the rotating shaft 35 are connected to the fixing bearings 33. The working section 353 is arranged in a middle of the rotating shaft 35 and is used for mounting the vane assemblies 36.

A plurality of vane assemblies 36 are provided, with each assembly consisting of two or more vanes arranged circumferentially around the rotating shaft 35. The angular spacing between the adjacent vane assemblies 36 in the circumferential direction of the rotating shaft 35 is $$\frac{360°}{n},$$

where n represents tie number of the vanes. The first rotating rods 31 are connected to an odd number of the vane assemblies 36, while the second rotating rods 32 are connected to an even number of the vane assemblies 36. The difference between the number of the vane assemblies 36 connected with the first rotating rods 31 and those connected to the second rotating rods 32 is 1.

Furthermore, the vanes on the rotating shaft 35 are mounted in a staggered and crossed configuration without any interference. The mounting orientations of the vanes of the vane assemblies 36 in the axial direction of the rotating shaft 35 remains consistent.

Furthermore, the rotating shaft 35 of the first rotating rods 31 or the second rotating rods 32 is designed according to the following steps:

Step 1: calculation of a shaft diameter. The minimum shaft diameter of the rotating shaft 35 is determined according to torsional strength conditions and calculated with reference to Formula (1):

$$d_{min} = \sqrt[s]{\frac{9550000p}{0.2[\tau T]n}} = A_0^s\sqrt{\frac{p}{n}} \tag{1}$$

where p is power (KW) transmitted by the shaft;
n is a rotating speed (r/min) of the shaft;
$A_0$ is a calculation coefficient;
$d_{min}$ is the minimum shaft diameter;
T is a torque transmitted by the shaft, and $T=9.55\times10^6$ P/n;
τ is required torsional shear stress.

Step 2: structural design of the rotating shaft 35:

In the present disclosure, the rotating shaft 35 is structurally designed as a stepped shaft, comprising an extension section 351, two journal sections 352, a working section 353, and two tool withdrawal grooves 354. The extension section 351 is arranged at one end of the rotating shaft 35 and is connected to the driving mechanism 2. A key groove is provided on the extension section 351 for stable connection with the driving mechanism 2 The journal sections 352 are arranged on both sides of the rotating shaft 35 and are connected to the fixing bearings 33. The working section 353 is arranged in a middle of the rotating shaft 35 and is used for mounting the vane assemblies 36. The journal sections 352 are arranged on either side of the rotating shaft 35 fit with the fixed bearings 33, achieving radial positioning through a transition fit.

Figure 4:
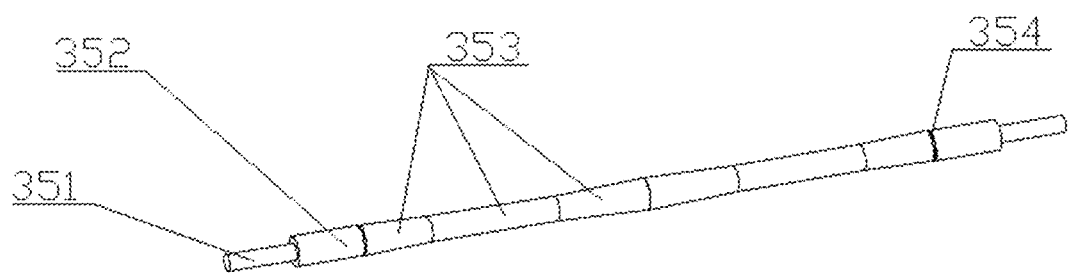
FIG. 4 is a schematic diagram of the 3-D structural drawing of a rotating shaft of the present disclosure.

To ensure machining precision and that end faces of adjacent parts align closely during assembly, the tool withdrawal grooves 354 are formed in the journals sections at both ends of the working section 353. A plurality of groups of vane assemblies 36 are mounted on the working section 353, which serves as the primary working area of the rotating shaft 35. Referring to FIG. 4, the working section 353 is divided into two or more segments, creating working section partitions. Slopes are arranged at both ends of each working section partition, gradually transitioning toward a center of the working segment partition and connecting with a central circular axis. This design prevents a spiral spring from deviating as it moves from the inlet to the outlet.

Furthermore, the specific parameters of the vanes of the vane assemblies 36 are as follows: the thicknesses of the vanes range from 3 mm to 50 mm, widths of the vanes range from 100 mm to 500 mm, and the lengths of the vanes ranges from 100 mm to 800 mm. The exact dimensions of the vanes should be determined by considering both the materials and transmission requirements of the workpieces to be conveyed.

The driving mechanism 2 includes a driving motor 21 and a driving apparatus 22. One side of an output end of the driving motor 21 is connected to one side of the extension section 351 of one rotating shaft 35 in the continuous stirring rotating rod assembly 3 via the driving apparatus 22.

The driving apparatus 22 includes gears 221, with one gear 221 being fixed to the extension section 351 of each of the rotating shafts 35. Adjacent gears 221 engage with each other via intermediate gears 223, whose center shafts of the intermediate gears 223 are connected to gear supports 224 through bearings. The support 1 is fixed by the gear supports 224 and all the gears 221 are arranged on the same straight line. One gear 221 at one end of the straight line engages with a driving gear 222, and an output end of the driving motor 21 is fixed to a center of the driving gear 222.

The continuous stirring rotating rod assembly 3 is provided with a plurality of first rotating rods 31 and a plurality of second rotating rods 32, the continuous stirring rotating rod assembly 3 is fixedly mounted on the support 1 in a crossed arrangement manner of the first rotating rods 31, the second rotating rods 32, the first rotating rods 31, the second rotating rods 32, . . . , an axial distance between the first rotating rods 31 and the second rotating rods 32 during mounting is a length of the vanes on the vane assemblies 36+1 mm–50 mm, and a spacing distance between the vane assemblies on the first rotating rods 31 or the second rotating rods 32 is a width of the vanes+1 mm–50 mm.

A working principle of the continuous stirring transmission mechanism for tempering furnace workpiece transmission provided by the present disclosure is as follows: before the mechanism works, the connection between the driving mechanism 2 and the continuous stirring transmission rotating rod assemblies 3 and a transmission direction of to-be-transmitted workpieces are confirmed respectively, the driving motor 21 is started after confirmation, and output power of the driving motor 21 drives the continuous stirring transmission rotating rod assemblies 3 to synchronously rotate and run through the driving apparatus 22; the metal workpieces requiring tempering are placed on the vane assemblies 36 of the continuous stirring transmission assemblies 3, the vane assemblies 36 rotate along with synchronous rotation of the first rotating rods 31 and the second rotating rods 32, the to-be-transmitted metal workpieces are stirred by the vanes on the continuous stirring transmission rotating rod assemblies 3 to slide to the vanes of the next rotating shaft 35, the operation is repeated in this way, the objective of continuous stirring transmission of the metal workpieces can be achieved in this process under the rotation of the vanes of the vane assemblies 36, the metal workpieces have a rolling characteristic in the stirring sliding process, positions, in contact with the vanes, of the metal workpieces continuously change as the metal workpieces are stirred and slide in the sliding and rolling process, that is, heated surfaces, transmitted in a tempering furnace, of the metal workpieces continuously change in the transmission process, such that the objective and effect of uniformly heating the metal workpieces are achieved.

The continuous stirring transmission mechanism for tempering furnace workpiece transmission provided by the present disclosure has the following beneficial effects: according to the continuous stirring transmission mechanism for tempering furnace workpiece transmission and the working method disclosed in the technical solution, the heated metal workpieces will continuously be overturned and move forward during transmission by this type of mechanism, heated positions of the metal workpieces continuously change along with overturning and conveying of the metal workpieces, overall uniform heating of the metal workpieces can be achieved in the transmission process of the metal workpieces, the problem of non-uniform heating of the metal workpieces in an existing continuous tempering furnace is solved, and mechanical performance of the metal workpieces is improved; and the driving mechanism of the continuous toggling transmission mechanism in the technical solution is mounted on the support and mounted outside the furnace body of a tempering furnace, such that pit excavation in a workshop is not required, and the problems such as large occupied area and difficult process adjustment in a transmission manner of the existing continuous tempering furnace are solved.

In this embodiment, detailed description is made by taking a spiral spring workpiece as an example:

there are four vanes in the circumferential direction of the rotating rods, that is, an included angle between the adjacent vanes in the circumferential direction is 90°;

steel plates 5 mm thick are selected and used as the vanes, and dimensions of the vanes are determined as 200 mm×100 mm×5 mm;

Referring to FIG. 3: four vanes are arranged in the circumferential direction of the rotating shaft 35 of the first rotating rods 31 or the second rotating rods 32 in a welded manner, one vane assembly 36 is formed by every four vanes, an included angle between the adjacent vanes of the vane assembly 36 in the circumferential direction is 90°, the vanes on the adjacently-mounted first rotating rods 31 and second rotating rods 32 are mounted in a crossed and staggered manner, and spatial mounting orientations of the vanes remain consistent.

In this embodiment, the first rotating rods 31 are determined as 11 groups of vane assemblies 36, the second rotating rods 32 are determined as 10 groups of vane assemblies, an axial distance between the adjacent first rotating rods 31 and second rotating rods 32 which are mounted in parallel is determined as 210 mm, and a spacing distance between the adjacent vane assemblies 36 on the first rotating rods 31 or the second rotating rods 32 is 110 mm.

When the mechanism works, the driving motor 21 is started, the driving motor 21 drives the continuous stirring transmission rotating rod assemblies formed by the first rotating rods 31 and the second rotating rods 32 to synchronous rotate and run by a gear set formed by the driving gear 222, the gears 221 and the intermediate gears 223, spiral springs requiring tempering are placed on the vane assemblies 36 connected with the first rotating rods 31 and the second rotating rods 32, the spiral spring workpieces are stirred by the vanes on the rotating shaft 35 to slide to the vanes of the next rotating shaft 35 along with synchronous rotation of the first rotating rods 31 and the second rotating rods 32, the operation is repeated in this way, the objective of continuous transmission of the spiral spring workpieces can be achieved, the spiral spring workpieces have a rolling characteristic in the stirring and sliding process, positions, in contact with the vanes, of the spiral springs continuously change as the spiral springs are stirred and slide in the sliding and rolling process, that is, heated surfaces, transmitted in a tempering furnace, of the spiral springs continuously change in the transmission process, such that the objective and effect of uniformly heating and stably transmitting the spiral springs are achieved.

Embodiment 2

This embodiment is based on the continuous stirring transmission mechanism for tempering furnace workpiece transmission provided based on Embodiment 1 of the present application. Embodiment 2 of the present application provides another continuous stirring transmission mechanism for tempering furnace workpiece transmission. Embodiment 2 is merely a preferred implementation of Embodiment 1, and independent implementation of Embodiment 1 will not be affected by implementation of Embodiment 2.

Specifically, in this embodiment, illustration is made by achieving transmission of rod-like workpieces with diameters phi of 50 mm×200 mm as an example. The continuous stirring transmission mechanism for tempering furnace workpiece transmission provided by Embodiment 2 of the present application differs from Embodiment 1 in that in the continuous stirring transmission mechanism, the driving apparatus 22 includes driven chain wheels 225 and a driving chain wheel 226, one driven chain wheel 225 is fixed to the extension section 351 of each of the rotating shafts 35, the driving chain wheel 226 is fixedly connected to a power output end of the driving motor 21, the driving chain wheel 226 and all the driven chain wheels 225 are connected through a closed chain 227 in a coupled manner, and all the driven chain wheels 225 and the driving chain wheel 226 are both arranged on the same straight line.

The driving apparatus 22 is driven by the driving motor 21, there are three vanes on each vane assembly 36 in the circumferential direction, that is, an included angle between the adjacent vanes in the circumferential direction is 120°; and steel plates 3 mm thick are selected and used as the vanes, and dimensions of the vanes are 500 mm×300 mm×3 mm.

The vanes of the vane assemblies 36 are mounted in a crossed and staggered manner, and spatial mounting orientations of the vanes remain consistent.

A working principle of the continuous stirring transmission mechanism for tempering furnace workpiece transmission provided by the present disclosure is as follows:

when the mechanism works, the motor of the driving apparatus drives the driving chain wheel 226 to rotate, the driving chain wheel 226 drives the driven chain wheels 225 to rotate through the chain 227, the driven chain wheels 225 drive the rotating shaft 35 to rotate, the rotating shaft 35 drives the first rotating rods 31 and the second rotating rods 32 to rotate, the rotating rod assemblies consisting of the first rotating rods 31 and the second rotating rods 32 synchronously rotate and run, rod-like metal materials with diameter phi of 50 mm×200 mm requiring tempering are placed on the vanes of the vane assemblies 36 of the rotating rod assemblies, the rod-like metal materials are stirred by the vanes on the first rotating rods 31 to slide to the vanes of the next second rotating rods 32 along with synchronous rotation of the first rotating rods 31 and the second rotating rods 32, and the operation is repeated in this way, such that the objective of continuous transmission of the rod-like metal materials can be achieved.

Compared with the related art, the continuous stirring transmission mechanism for tempering furnace workpiece transmission provided by the present disclosure has the following beneficial effects:

the rod-like metal materials have a rolling characteristic in the stirring and sliding process, positions, in contact with the vanes, of the rod-like metal materials continuously change as the rod-like metal materials are stirred and slide in the sliding and rolling process, that is, heated surfaces, transmitted in a tempering furnace, of the rod-like metal materials continuously change in the transmission process, such that the objective and effect of uniformly heating and stably transmitting the rod-like metal materials are achieved.

Embodiment 3

This embodiment is based on the continuous stirring transmission mechanism for tempering furnace workpiece transmission provided by Embodiment 1 or Embodiment 2 of the present application. Embodiment 3 of the present application provides yet another continuous stirring transmission mechanism for tempering furnace workpiece transmission. Embodiment 3 is merely a preferred implementation of Embodiment 1 or Embodiment 2, and independent implementation of Embodiment 1 or Embodiment 2 will not be affected by implementation of Embodiment 3. Specifically, in this embodiment, a plurality of groups of continuous stirring rotating rod assemblies 3 are arranged in the heat treatment furnace body 4 from top to bottom, and each of the plurality of groups of continuous stirring rotating rod assemblies 3 is connected with the driving mechanism 2 in Embodiment 1 or Embodiment 2, which achieves the batched heat treatment and transmission of workpieces.

The present disclosure further provides a transmission method of a continuous stirring transmission mechanism for tempering furnace workpiece transmission, including the following steps:

Step 1: a driving mechanism 2 is connected with extension sections 351 of continuous stirring rotating rod assemblies 3, such that the driving mechanism 2 can drive the continuous stirring rotating rod assemblies 3 to rotate.

Step 2: journal sections 352 of the continuous stirring rotating rod assemblies 3 are connected with fixing bearings 33 through bearings, and the fixing bearings 33 are fixed to two sides of an upper portion of a support 1, such that the continuous stirring rotating rod assemblies 3 can be stably mounted on the support 1.

Step 3: vane assemblies 36 are uniformly arranged on working sections 353 of the continuous stirring rotating rod assemblies 3 in circumferential directions of rotating shafts 35, and the vane assemblies 36 are fixedly connected with the rotating shafts 35.

Wherein each of the vane assemblies 36 consists of two or more vanes, an angular spacing between the adjacent vane assemblies 36 in the circumferential direction of the rotating shaft 35 is $$\frac{360°}{n},$$

where n is the number of vanes;
the first rotating rods 31 are connected with an odd number of the vane assemblies 36, the second rotating rods 32 are connected with an even number of the vane assemblies 36, and a difference between the number of the vane assemblies 36 connected with the first rotating rods 31 and the number of the vane assemblies 36 connected with the second rotating rods 32 is 1; and
mounting orientations of the vanes of the vane assemblies 36 in axial directions of the rotating shafts 35 remain consistent.

Step 4: the driving mechanism 2 is switched on to drive the continuous stirring rotating rod assemblies 3 to rotate.

Wherein as the vane assemblies 36 are mounted in a staggered and crossed manner, when the continuous stirring rotating rod assemblies 3 rotate, the vane assemblies 36 will generate alternately-changing thrust and tension, the vane assemblies 36 connected with the first rotating rods 31 will push the materials leftwards, and the vane assemblies 36 connected with the second rotating rods 32 will pull the materials rightwards, such that the materials can be continuously stirred.

Step 5: a speed of the driving mechanism 2 is adjusted as needed, so as to control rotating speeds of the continuous stirring rotating rod assemblies 3, thereby changing a stirring speed of materials.

What are mentioned above are only embodiments of the present disclosure and is not intended to limit the patent scope of the present disclosure, and therefore any equivalent structure transformation or equivalent process transformation made by using the contents of the specification and the drawings of the present disclosure, or direct or indirect application in other related technical fields, is also included in the patent protection scope of the present disclosure.

What is claimed is:

1. A method of continuous stirring transmission of a tempering furnace workpiece, comprising the following steps:

step 1: connecting a driving mechanism (2) with extension sections (351) of continuous stirring rotating rod assemblies (3), such that the driving mechanism (2) drives the continuous stirring rotating rod assemblies (3) to rotate;

step 2: performing bearing connection between journal sections (352) of the continuous stirring rotating rod assemblies (3) and fixed bearings (33), and fixing the fixed bearings (33) to two sides of an upper portion of a furnace body support (41), such that the continuous stirring rotating rod assemblies (3) are allowed to be stably mounted on the furnace body support (41);

step 3: uniformly arranging vane assemblies (36) on working sections (353) of the continuous stirring rotating rod assemblies (3) in circumferential directions of rotating shafts (35), and fixedly connecting the vane assemblies (36) with the rotating shafts (35);

wherein each of the vane assemblies (36) consists of two or more vanes, an angular spacing between the adjacent vane assemblies (36) in the circumferential direction of the rotating shaft (35) is $$\frac{360°}{n},$$

wherein n is number of vanes;

a first rotating rod (31) is connected with an odd number of the vane assemblies (36), a second rotating rod (32) is connected with an even number of the vane assemblies (36), and a difference between the number of the vane assemblies (36) connected with the first rotating rod (31) and the number of the vane assemblies (36) connected with the second rotating rod (32) is 1; and mounting orientations of the vanes of the vane assemblies (36) arranged in axial directions of the rotating shafts (35) remain consistent;

step 4: switching on the driving mechanism (2) to drive the continuous stirring rotating rod assemblies (3) to rotate; and step 5: adjusting a speed of the driving mechanism (2) as needed, so as to control rotating speeds of the continuous stirring rotating rod assemblies (3), thereby changing a stirring speed of materials.

2. The method according to claim 1, wherein, due to staggered and crossed arrangement of the vane assemblies (36), the rotation of the continuous stirring rotating rod assemblies (3) generates alternating thrust and tension, the vane assemblies (36) connected with the first rotating rod (31) push materials leftwards, and the vane assemblies (36) connected to the second rotating rod (32) pull the materials rightwards, thereby allowing the materials to be continuously stirred.

3. A continuous transfer mechanism for tempering furnace workpiece, comprising a heat treatment furnace body (4) and a furnace body support (41), wherein the heat treatment furnace body (4) is fixed by the furnace body support (41), the heat treatment furnace body (4) comprises a furnace body shell, a heat preservation and insulation system and a heating system, the heating system supplies heat to the heat treatment furnace body (4), and the heating system is an electric heating system; wherein the continuous transfer mechanism further comprises a driving mechanism (2) and continuous stirring rotating rod assemblies (3), and the furnace body support (41) further supports the driving mechanism (2) and the continuous stirring rotating rod assemblies (3);

the continuous stirring rotating rod assemblies (3) are connected with the driving mechanism (2), each of the continuous stirring rotating rod assemblies (3) comprises a set of first rotating rods (31), a set of second rotating rods (32) and fixed bearings (33), the set of first rotating rods (31) and the set of second rotating rods (32) are mounted side by side, each of the set of first rotating rods (31) and each of the set of second rotating rods (32) are arranged alternately and parallel to each other, two ends of each of the first rotating rods (31) and two ends of each of the second rotating rods (32) are in bearing connection with the fixed bearings (33), respectively, the fixed bearings (33) are mounted on both sides of the upper section of the furnace body support (41), the continuous stirring rotating rod assemblies (3) are mounted on the furnace body support (41) through the fixed bearings (33);

each of the first rotating rods (31) and the second rotating rods (32) comprises a rotating shaft (35) and a plurality of vane assemblies (36) uniformly arranged around a circumference of the rotating shaft, the vane assemblies (36) are fixedly connected to the rotating shaft (35), and their spatial orientations remain consistent;

the rotating shaft (35) comprises an extension section (351), two journal sections (352), a working section (353) and two tool withdrawal grooves (354), the extension section (351) is arranged at one end of the rotating shaft (35) and is connected to the driving mechanism (2), the journal sections (352) are arranged on both sides of the rotating shaft (35) and are connected to the fixed bearings (33), the working section (353) is arranged in a middle portion of the rotating shaft (35) and is used to mount the vane assemblies (36); and each vane assembly (36) comprises two or more vanes arranged around a circumferential direction of the rotating shaft (35), an angular spacing between adjacent vane assemblies (36) along the circumference of the rotating shaft (35) is $$\frac{360°}{n},$$

wherein n represents number of the vanes, each of the first rotating rods (31) is connected to an odd number of the vane assemblies (36), while each of the second rotating rods (32) is connected with an even number of the vane assemblies (36), and difference between the number of the vane assemblies (36) on each of the first rotating rods (31) and each of the second rotating rods (32) is 1.

4. The continuous transfer mechanism for tempering furnace workpiece according to claim 3, wherein the driving mechanism (2) comprises a driving motor (21) and a driving apparatus (22), and one side of an output end of the driving motor (21) is connected to one side of the extension section (351) of one rotating shaft (35) in the continuous stirring rotating rod assembly (3) via the driving apparatus (22).

5. The continuous transfer mechanism for tempering furnace workpiece according to claim 4, wherein the driving apparatus (22) comprises gears (221), one gear (221) is fixed to the extension section (351) of each rotating shaft (35), adjacent gears (221) engage with each other through intermediate gears (223), center shafts of the intermediate gears (223) are in bearing connection with gear supports (224), the furnace body support (41) is fixed by the gear supports (224), all the gears (221) are arranged on a same straight line, wherein one gear (221) at an end of the straight line engages with a driving gear (222), and an output end of the driving motor (21) is fixed to a center of the driving gear (222).

6. The continuous transfer mechanism for tempering furnace workpiece according to claim 4, wherein the driving apparatus (22) comprises driven chain wheels (225) and a driving chain wheel (226), one driven chain wheel (225) is fixed to the extension section (351) of each of the rotating shafts (35), the driving chain wheel (226) is fixedly connected to a power output end of the driving apparatus (22), the driving chain wheel (226) and all the driven chain wheels (225) are connected in a coupled manner via a closed chain (227), with both the driven chain wheels (225) and the driving chain wheel (226) arranged along the same straight line.

7. The continuous transfer mechanism for tempering furnace workpiece according to claim 5, wherein the continuous stirring rotating rod assembly (3) is fixedly mounted on the furnace body support (41) in an alternating crossed arrangement of the first rotating rods (31) and the second rotating rods (32), an axial distance between one of the first rotating rods (31) and an adjacent one of the second rotating rods (32) during installation is a length of the vanes on the vane assemblies (36) plus 1 mm to 50 mm, while a spacing distance between the adjacent vane assemblies on each of the first rotating rods (31) or each of the second rotating rods (32) is a width of the vanes plus 1 mm to 50 mm.

* * * * *